Patented Sept. 16, 1941

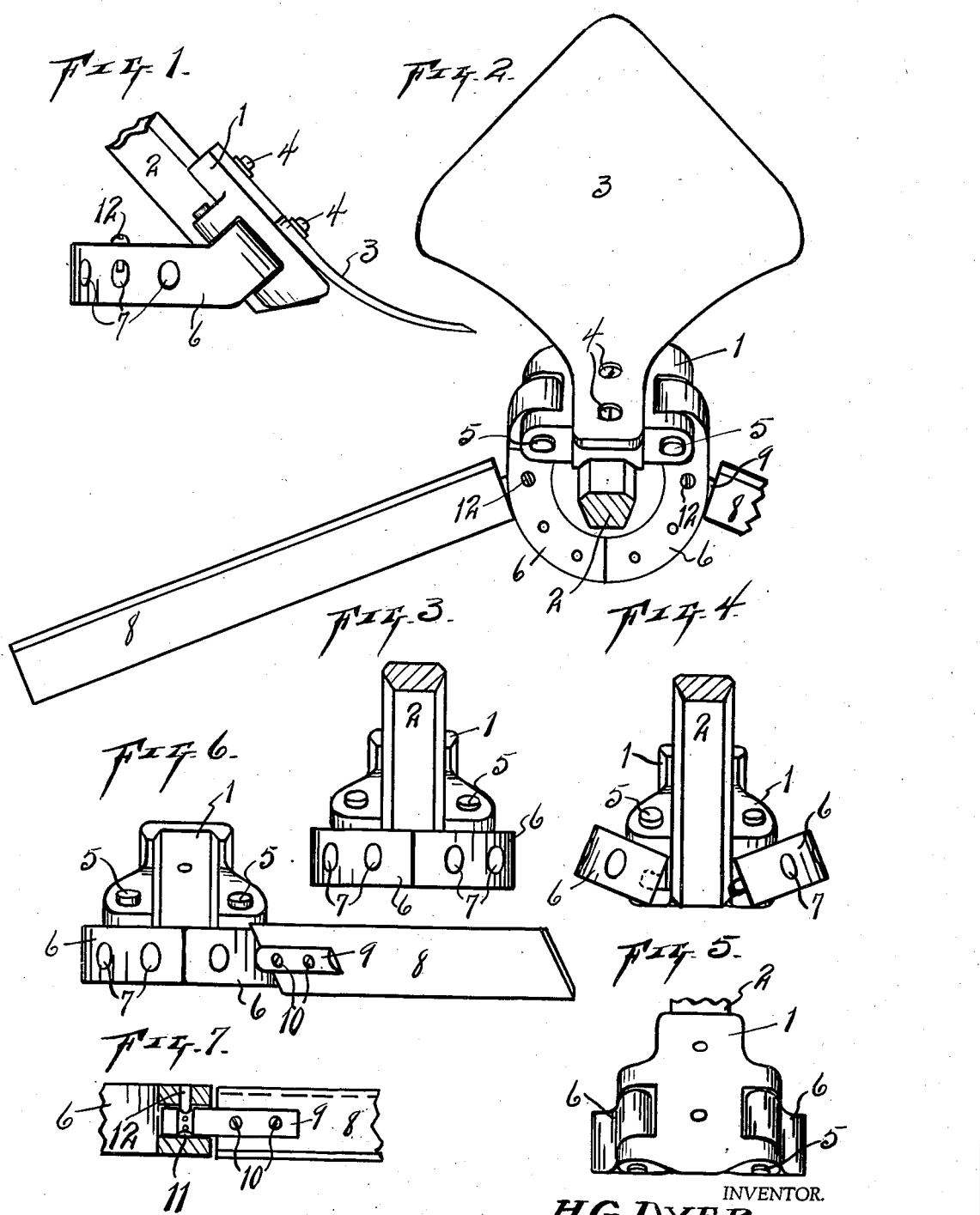

2,256,384

UNITED STATES PATENT OFFICE 2,256,384

ATTACHMENT FOR CULTIVATORS AND THE LIKE

Horace G. Dyer, Fort Worth, Tex., assignor to Robert E. Collier, Fort Worth, Tex.

Application September 8, 1939, Serial No. 295,122

3 Claims. (Cl. 97—205)

My invention relates to attachments for cultivators and the like, and more particularly to a means for adjustably supporting a pair of sweeps in operative relation with a plow which is carried on the standard of a cultivator.

The object of this invention is to provide a compact, simple and inexpensive attachment for cultivators which is adapted to swingingly adjustably support a pair of sweeps which will co-act with a cultivator plow for conditioning the soil without hindrance to the plant.

An advantage of this invention is that a one row cultivator may be converted into a two row cultivator by adjusting the sweeps in proper relation with the cultivator plow.

Another advantage of this invention is that the structure is light and durable and may be adjusted with a minimum amount of effort.

Another advantage of this attachment is that it will function to secure a loose mulch of the surface of the soil.

Other objects and advantages will be fully explained in the following description and the invention will be more particularly pointed out in the claims.

Reference is had to the accompanying drawing which forms a part of this application.

Fig. 1 is a side elevation of the device, shown attached to the conventional cultivator standard.

Fig. 2 is a plan view of the same.

Fig. 3 is a rear view of the same.

Fig. 4 is a rear view of the device, showing a variation in the structure thereof.

Fig. 5 is a front elevation of the device.

Fig. 6 is a detail view of the device, shown with one of the sweeps removed.

Fig. 7 is a detail view of one of the sweeps and means for adjustably attaching the same to one of the swinging members.

Similar characters of reference are used to indicate the same parts throughout the several views.

The device consists of a ring type structure which is adapted to encase the lower end of a cultivator standard and support a pair of sweeps in operative relation with the cultivator plow. The ring structure is formed in three segments. One of the ring segments 1 is formed so as to rest upon and conform to the leading surface of the standard 2 of a cultivator. The shank of the cultivator plow 3 is placed upon the segment 1 and these are held in a rigid manner by means of a pair of bolts 4. The segment 1 is interposed between the leading edge of the standard 2 and the plow 3 and the bolts are passed through the shank of the plow, the segment 1 and the standard 2.

The other two segments of the three piece ring structure are each pivotally connected one to each edge of the segment 1 by means of a pivotal pin 5. These segments 6 are adapted to normally swing rearwardly relative to the standard 2 and encase the same. The outer periphery of the two segments 6 of the ring structure are provided with a plurality of openings 7 which are formed to receive and adjustably hold blade type vanes or sweeps 8. The holes 7 are radially disposed in the segments 6 so that the sweeps 8 may be carried at various angles relative to the plow 3 of the cultivator. Each segment 6 of the ring structure is adapted to support one sweep 8.

The sweeps 8 are each formed of a relatively long piece of thin metal having the opposite longitudinal edges sharpened so as to engage the soil and serve as a plow or hoe. One end of the sweep 8 is adapted to project into a slot formed in the end of a shaft 9. Bolts 10 are passed through the shaft 9 and through the sweep 8 for removably holding the two together. The end of the shaft, opposite the sweep 8, is extended and provided with an annular groove 11. This grooved portion of the shaft 9 is adapted to project into the openings 7 which are provided in the swinging sections 6 of the ring structure. The sweeps 8 are held in their respective swinging sections 6 of the ring by means of a pin 12 or set-screw which passes through the ring section and into the groove 11 of the shaft 9. The valley of the annular groove 11 is provided with indentations for the reception of the set-screw 12 in order to insure the rigidity of the vane with the ring when the vane or sweep 8 is adjusted to the desired slant relative to the horizontal. In this instance, the two swinging portions of the split collar are each provided with three openings 7. When the sweep 8 is adjustably positioned in the opening 7, adjacent the plow 3, it will co-operate with the other sweep to span the maximum width of cultivating the soil. When the operator desires to cultivate a smaller strip of land, he may move the sweeps 8 to either of the rear openings 7 provided in the collar portions 6.

The segmental ring which is adapted to be secured to the standard 2 of a cultivator is formed so that its axis will be in a vertical plane. This position of the ring requires that the portion 1 of the ring be positioned at an angle to the sectors 6 of the ring. The portion 1 of the ring is set an angle to conform with the angle of the conventional cultivator standard 2. The standard 2 is normally positioned on the cultivator (not shown) so as to extend downwardly and forward at an angle of approximately forty five degrees.

When the sweeps 8 drag the soil the pivoted sectors 6 will be forced to swing to the rear of the cultivator standard 2 and encase the same. The free ends of the sectors 6 will, in this instance, be forced against each other in a manner so as to serve as a brace for the unit embracing the standard 2. In some instances, one of the sweeps may be forced against rocks or a stump in a field and break one of the sectors 6 of the unit. If this should happen the operator may repair the device without removing the whole unit from the standard 2 which would be a loss of time and expensive. The swing of the members 6 permits the operator to have ease of access to adjustment of the sweeps 8 and also access to the lower bolts holding the member 1 rigid with the cultivator standard 2.

What I claim is:

1. An attachment for cultivators and the like consisting of a collar formed into three sections, one of said sections being rigidly attached to the standard of a cultivator, each of the other two sections of said collar being pivotally connected to the said first named section and adapted to encase said standard, and means for adjustably securing sweeps in various portions of the outer periphery of each of said pivotally connected sections of said collar.

2. An attachment for cultivators and the like consisting of a circular member formed in three sections, one of said sections being rigidly attached to the standard of a cultivator and adapted to operatively support a plow, the other two sections of said member being each pivotally connected to said first named section, the free ends of said last named sections being provided with means for aligning said ends with each other when the same are brought around said standard and into engagement with each other, and means provided in the outer periphery of said last named sections for adjustably supporting sweeps in operative relation with said plow.

3. An attachment for cultivators and the like consisting of an elongated member rigidly attached to the front of the standard of a cultivator, a pair of arc shaped members pivotally attached one to each side of said elongated member, said pivoted members being adapted to swing around said standard whereby their free ends may engage and support each other, and radial openings disposed in said pivoted members for adjustably holding ground sweeps relative to said standard.

HORACE G. DYER.